United States Patent
Giebel et al.

(10) Patent No.: US 8,154,783 B2
(45) Date of Patent: Apr. 10, 2012

(54) METHOD AND APPARATUS FOR CONTROLLING MIRROR MOTION IN LIGHT SCANNING ARRANGEMENTS

(75) Inventors: James Giebel, Centerport, NY (US); Peter Fazekas, Bayport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 594 days.

(21) Appl. No.: 12/211,522

(22) Filed: Sep. 16, 2008

(65) Prior Publication Data

US 2010/0066275 A1    Mar. 18, 2010

(51) Int. Cl.
*G02B 26/08* (2006.01)

(52) U.S. Cl. .................. 359/199.3; 359/200.7; 359/900; 318/128

(58) Field of Classification Search .... 359/198.1–199.2, 359/199.3, 200.7, 213.1–215.1; 318/119
See application file for complete search history.

(56) References Cited

U.S. PATENT DOCUMENTS

| 5,907,146 | A | 5/1999 | Bridgelall et al. |
| 6,192,056 | B1 | 2/2001 | Tsuruoka |
| 6,332,576 | B1 * | 12/2001 | Colley et al. ............. 235/462.32 |
| 7,126,734 | B1 | 10/2006 | Giebel et al. |
| 2006/0118627 | A1 | 6/2006 | Joseph et al. |

OTHER PUBLICATIONS

International Search Report and Written Opinion dated Mar. 8, 2010 in related case PCT/US2009/056430.

\* cited by examiner

*Primary Examiner* — James Phan (57) ABSTRACT

A method and apparatus of driving a motor in a light scanning arrangement. The method includes the following steps: (1) driving a drive coil with a drive signal to oscillate a scan mirror and a light beam reflected from the scan mirror; (2) generating a feedback signal having zero crossings during oscillation of the scan mirror by a feedback coil in proximity to the drive coil; (3) integrating the feedback signal to generate an integrated feedback signal; and (4) processing the integrated feedback signal to generate a periodic drive signal that has the same time period as the feedback signal.

16 Claims, 5 Drawing Sheets

METHOD AND APPARATUS FOR CONTROLLING MIRROR MOTION IN LIGHT SCANNING ARRANGEMENTS

FIELD OF THE DISCLOSURE

The present disclosure generally relates to controlling the motion of a scan mirror employed for sweeping a light beam in electro-optical readers for reading indicia such as bar code symbols, or in image projectors for displaying images.

BACKGROUND

Electro-optical readers are well known in the art for electro-optically transforming a spatial pattern of graphic indicia, known as a symbol, into a time-varying electrical signal which is then decoded into data. Typically, a light beam generated from a light source is focused by a lens along an optical path toward a target that includes the symbol. The light beam is repetitively swept along a scan line or a series of scan lines arranged in a raster pattern over the symbol by moving a scan mirror located in the optical path. A photodetector detects light scattered or reflected from the symbol and generates an analog electrical signal. Electronic circuitry converts the analog signal into a digitized signal having pulse widths corresponding to physical widths of bars and spaces comprising the symbol, and a decoder decodes the digitized signal into data descriptive of the symbol.

The repetitive sweeping of the light beam is performed by a drive, typically a motor having a rotor oscillatable about an axis. A permanent magnet and the scan mirror are jointly oscillatable with the rotor. The motor is driven by a drive coil wound on a bobbin that is located physically close to the permanent magnet. A feedback coil is also wound on the same bobbin. In response to an alternating voltage drive signal applied to the drive coil, the electromagnetic field produced by the drive coil interacts with the permanent magnetic field of the magnet, thereby jointly moving the magnet and the mirror. The motor and mirror assembly form a resonant mechanical structure, where the natural frequency of this structure determines oscillation frequency. The frequency of the drive signal in the drive coil is the same as the rotor motion, with one cycle of the drive signal corresponding to one cycle of rotor motion. The amplitude of the drive signal in the drive coil is proportional to the velocity of the rotor motion. The polarity of the drive signal in the drive coil is dependent on the direction of rotor motion such that a positive half cycle of the drive signal indicates that the rotor is moving in one drive direction, and a negative half cycle indicates that the rotor is moving in the opposite drive direction. Zero crossings of the drive signal occur when the rotor reaches its maximum travel at each end of a respective scan line. At each zero crossing, the rotor stops for an instant and reverses drive direction.

The feedback coil is useful for a variety of purposes. It generates an alternating voltage signal, known as a feedback signal, due to the movement of the magnet. The frequency and polarity of the feedback signal generated in the feedback coil corresponds to the frequency and polarity of the moving magnet. An electrical drive monitoring circuit is often employed to monitor the amplitude of the feedback signal and, for example, turn the light source off if the amplitude falls below a predetermined threshold, thereby indicating that the drive is malfunctioning. An electrical closed loop control circuit is also often employed to process the feedback signal to make decisions about how to continue driving the motor. Still another electronic circuit that is often employed processes the zero crossings of the feedback signal to derive a start-of-scan (SOS) signal that represents rotor motion and is used to synchronize the scan lines.

In some implementations, the electrical closed loop control circuit is used to regulate the peak values of the feedback signal generated from the feedback coil. If the magnitude of a peak value (either positive peak or negative peak) is smaller than a desired (or target) value, the electrical closed loop control circuit will try to increase the current applied to the drive coil in order to increase the magnitude of the peak value. On the other hand, if the magnitude of a peak value (either positive peak or negative peak) is larger than a desired (or target) value, the electrical closed loop control circuit will try to decrease the current applied to the drive coil in order to decrease the magnitude of the peak value.

With the electrical closed loop control circuit described above, each peak value of the feedback signal can be maintained close to certain desired (or target) value. This electrical closed loop control circuit enables the peak velocity of the scan mirror to be regulated, because the feedback signal generated from the feedback coil is proportional to the first derivative of scan mirror's displacement function. This electrical closed loop control circuit can also be used to regulate the scan amplitude of the scan mirror, provided that the motor's operating frequency remains unchanged. In some operation environments, however, the motor's operating frequency can be changed for variety of reasons. Therefore, with the electrical closed loop control circuit described above, even if each peak value of the feedback signal can be maintained close to certain desired (or target) value, the scan amplitude of the scan mirror will change in proportion to any change in motor frequency. Such change will introduce amplitude errors. The scan amplitude of the scan mirror can be different than, or can drift away from, the desired (or targeted) scan amplitude.

Accordingly, in some operation environments, it is desirable to have certain electrical closed loop control circuit that can maintain the scan amplitude of the scan mirror close to a constant value, as an improvement of the circuit that merely regulates the peak velocity of the scan mirror.

SUMMARY

In one aspect, the invention is directed to a method of driving a motor in a light scanning arrangement. The method includes the following steps: (1) driving a drive coil with a drive signal to oscillate a scan mirror and a light beam reflected from the scan mirror; (2) generating a feedback signal having zero crossings during oscillation of the scan mirror by a feedback coil in proximity to the drive coil; (3) integrating the feedback signal to generate an integrated feedback signal; and (4) processing the integrated feedback signal to generate the drive signal as a square wave having vertical edges respectively corresponding to the zero.

In another aspect, the invention is directed to a motor drive circuit in a light scanning arrangement. The motor drive circuit includes a drive coil and a feedback coil. The drive coil driven by a drive signal to oscillate a scan mirror and a light beam reflected from the scan mirror. The feedback coil generates a feedback signal having zero crossings during oscillation of the scan mirror. The motor drive circuit also includes circuitry for integrating the feedback signal to generate an integrated feedback signal. The motor drive circuit further includes circuitry for processing the integrated feedback signal to generate the drive signal as a square wave having vertical edges respectively corresponding to the zero crossings.

Implementations of the invention can include one or more of the following advantages. The scan magnitude of the scan mirror can be directly regulated and be maintained close to certain constant. These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
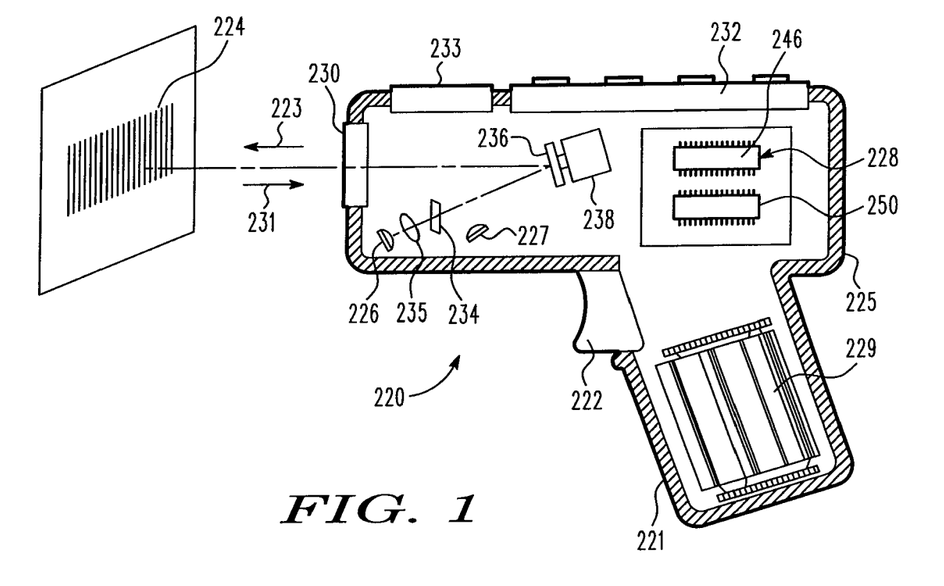
FIG. 1 is a diagrammatic view of a hand-held instrument for electro-optically reading indicia.

Reference numeral 220 in FIG. 1 identifies an electro-optical reader for electro-optically reading indicia, such as bar code symbol 224, located in a range of working distances therefrom. The reader 220 has a pistol grip handle 221 and a manually actuatable trigger 222 which, when depressed, enables a light beam 223 to be directed at the symbol 224. The reader 220 includes a housing 225 in which a light source 226, a light detector 227, signal processing circuitry 228, and a battery pack 229 are accommodated. A light-transmissive window 230 at a front of the housing enables the light beam 223 to exit the housing, and allows light 231 scattered off the symbol to enter the housing. A keyboard 232 and a display 233 may advantageously be provided on a top wall of the housing for ready access thereto.

In use, an operator holding the handle 221 aims the housing at the symbol and depresses the trigger. The light source 226 emits a light beam which is optically modified and focused by an optical focusing assembly 235 to form a beam spot on the symbol 224. The beam passes through a beam splitter 234 to a scan mirror 236 which is repetitively oscillated at a scan rate of at least 20 scans a second by a motor drive 238. The scan mirror 236 reflects the beam incident thereon to the symbol 224 and sweeps the beam spot in scans across the symbol in a scan pattern. The scan pattern can be a scan line extending lengthwise along the symbol along a scan direction, or a series of scan lines arranged along mutually orthogonal directions, or an omnidirectional pattern, just to name a few possibilities.

The reflected light 231 has a variable intensity over the scan pattern and passes through the window 230 onto the scan mirror 236 where it is reflected onto the splitter 234 and, in turn, reflected to the photodetector 227 for conversion to an analog electrical signal. The signal processing circuitry 228 digitizes and decodes the signal to extract the data encoded in the symbol.

Figure 2:
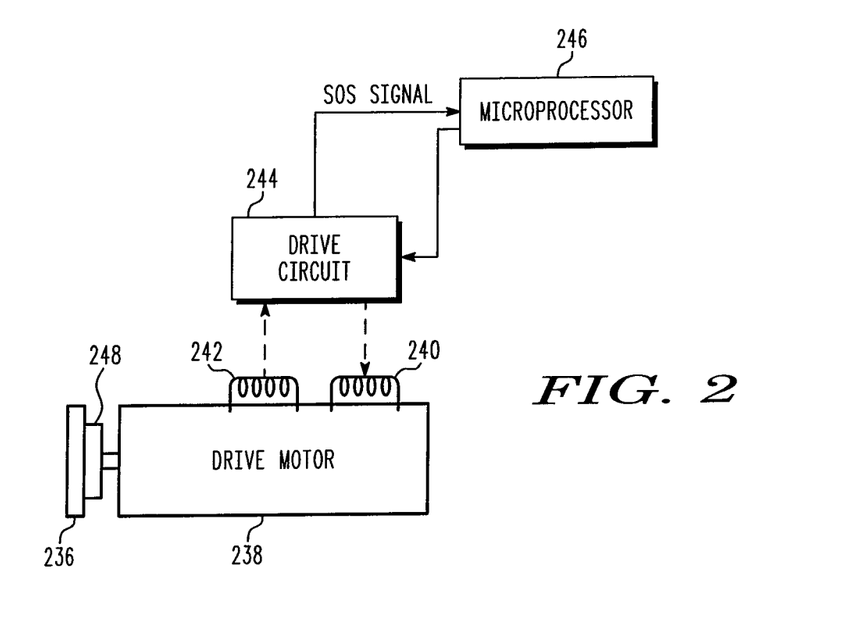
FIG. 2 is a block diagram of some of the components in the instrument of FIG. 1.

The drive motor 238 is shown in more detail in FIG. 2 with a drive coil 240 and a feedback coil 242 both wound on a common bobbin. The signal processing circuitry 228 includes a control microprocessor 246 operative for sending a control signal to a drive circuit 244 which, in turn, sends a drive signal to the drive coil 240 to generate an electromagnetic field that interacts with a permanent magnet 248 and drives the motor 238.

Figure 4:
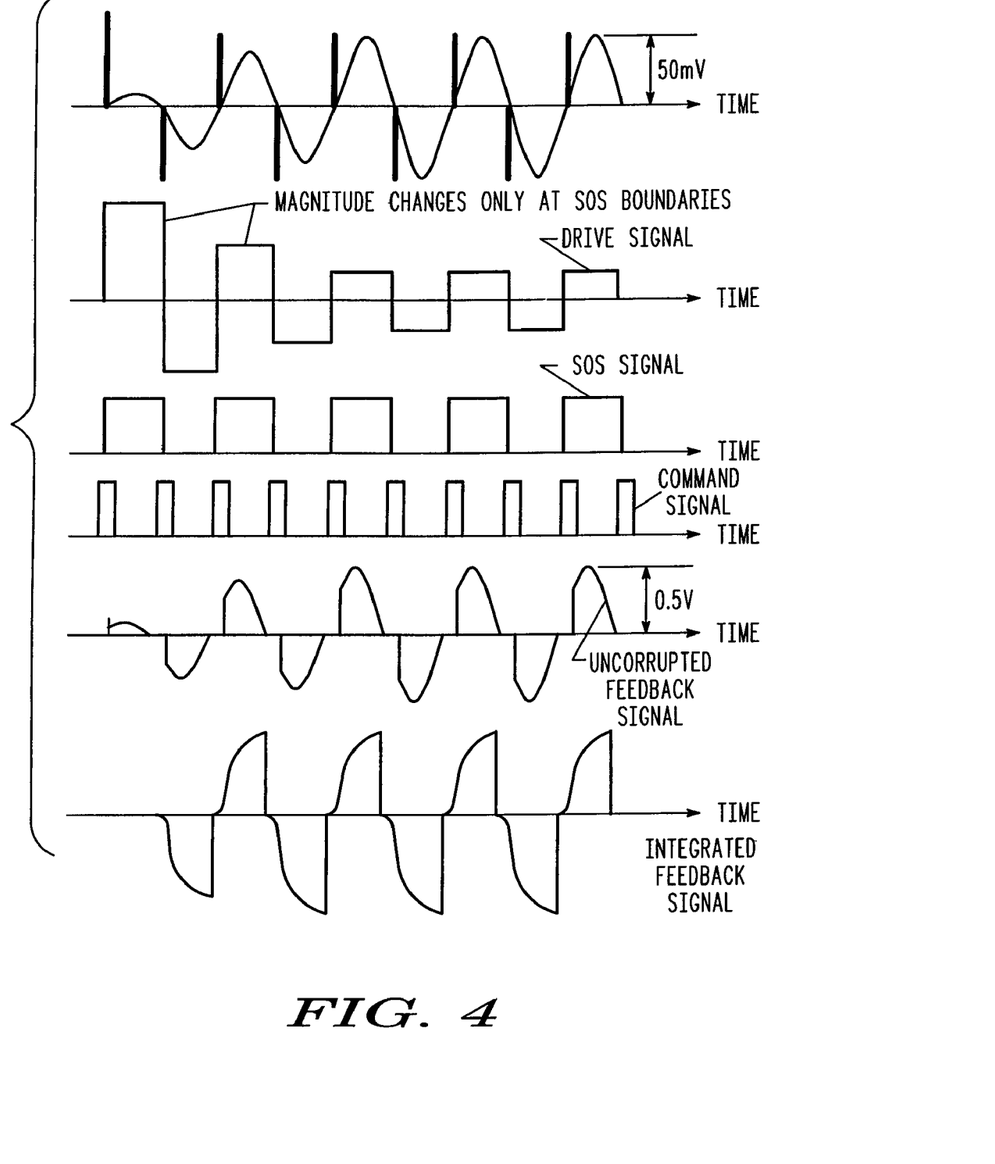
FIG. 4 is a series of signals generated in the circuit of FIG. 3.
Figure 5:
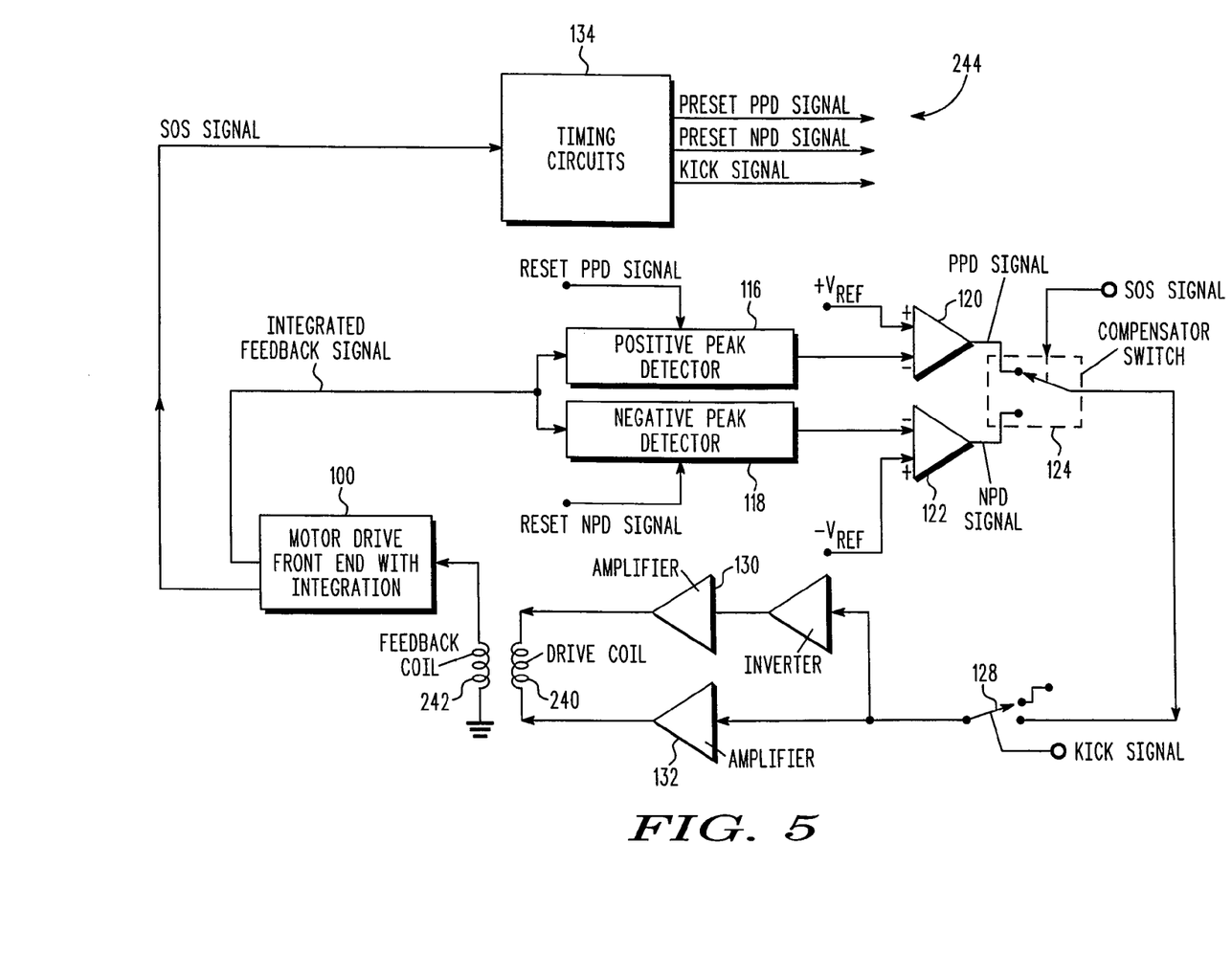
FIG. 5 is a block diagram of the arrangement of FIG. 2 with additional components for use in the instrument of FIG. 1.
Figure 6:
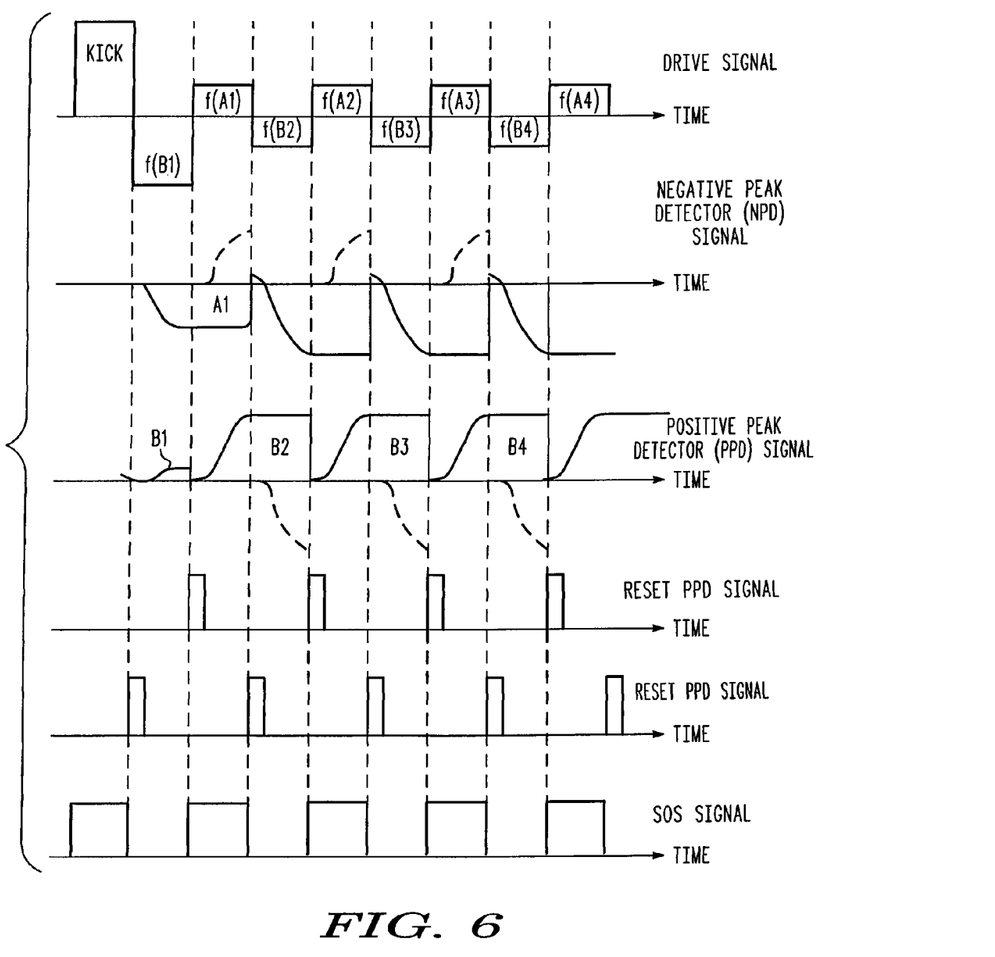
FIG. 6 is a series of signals generated in the circuit of FIG. 5.

The drive circuit 244 is shown in its entirety in FIG. 5, with explanatory signal waveforms depicted in FIG. 6. A motor drive front end circuit 100 depicted in FIG. 5 is shown in more detail in FIG. 3, with explanatory signal waveforms depicted in FIG. 4. The drive circuit 244 is advantageously implemented in an application specific integrated circuit (ASIC) 250 which, together with the microprocessor 246, constitute the signal processing circuitry 228.

Figure 3:
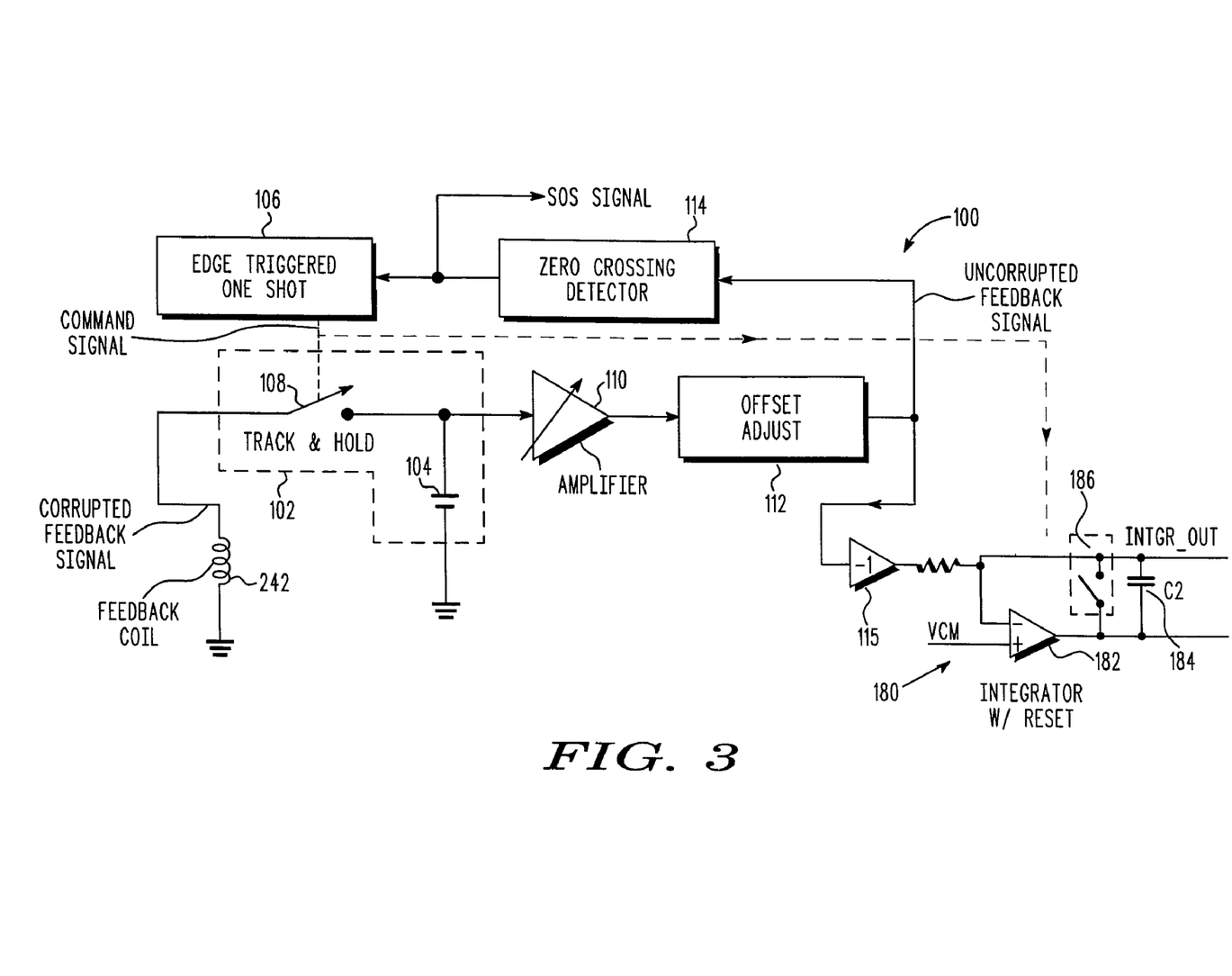
FIG. 3 is a block diagram further detailing the arrangement of FIG. 2.

As previously mentioned, a square wave drive signal is conducted to the drive coil 240 to cause the scan mirror 236 to oscillate. At the same time, the jointly mounted magnet 248 oscillates and generates a feedback signal in the feedback coil 242. Crosstalk between the coils 240, 242 only occurs at the amplitude changes of the square wave drive signal, that is, at its vertical edge transitions. The resulting corrupted feedback signal is shown in FIG. 4 and is conducted to the track and hold circuit 102 having a capacitor 104. An edge-triggered one shot circuit 106 is operatively connected to a switch 108 in the track and hold circuit. The output of the track and hold circuit is conducted to an adjustable gain amplifier 110 whose output is conducted through a DC voltage offset adjustment circuit 112. The output of the adjustment circuit 112 is connected to a zero crossing detector 114 operative for detecting zero crossings in the feedback signal and for generating the aforementioned SOS signal. The output of the zero crossing detector is connected to the one shot circuit 106.

The output of the adjustment circuit 112 is also connected to an integration circuit 180 though a buffer amplifier, such as an inverter 115. The integration circuit 180 includes an operational amplifier 182, a capacitor 184, and a switch 186. The switch 186 can be opened or closed under the control of the edge-triggered one shot circuit 106.

In operation, the track and hold circuit 102 monitors the corrupted feedback signal whose voltage is used to charge the capacitor 104. At each zero crossing of the feedback signal, the one shot circuit 106 is triggered to generate the command signal. The command signal opens the switch 108 at each zero crossing, effectively removing the crosstalk present at each zero crossing. The uncorrupted feedback signal shown in FIG. 4 has the same general shape as the corrupted feedback signal, except the crosstalk at each zero crossing has been removed.

In operation, the command signal also closes the switch 186 at each zero crossing to reset the voltage across the integration capacitor 184. When the switch 186 is reopened shortly after the closing of the switch at each zero crossing, the integration circuit 180 will start to integrate the uncorrupted feedback signal received from the adjustment circuit 112. The integration circuit 180 will generate an integrated feedback signal at the output of the integration circuit. The integrated feedback signal is also shown in FIG. 4.

In an ideal situation, if the feedback signal generated from the feedback coil 242 is not corrupted, this feedback signal can be directly integrated by the integration circuit 180 after the feedback signal is adjusted for certain offset. In addition, if the switch 186 is reopened almost instantaneously after the closing of the switch at each zero crossing to initiate the integration of the feedback signal generated from the feedback coil 242, the integrated feedback signal at the output of the integration circuit 180 will be proportional to the angular displacement of the scan mirror, where the angular displacement is measured from the maximum angular displacement when the scan mirror reverses its scanning direction. If the peak of the integrated feedback signal is compared with certain reference levels, as shown in FIG. 5, the scan magnitude of the scan mirror can be directly regulated with the drive circuit 244. Consequently, the scan amplitude of the scan mirror can be maintained close to certain constant.

In some real situation, even if the feedback signal generated from the feedback coil 242 is corrupted, this feedback signal can still be directly integrated by the integration circuit 180 after the feedback signal is adjusted for certain offset. If the switch 186 is reopened after a small time delay as measured from the closing of the switch at each zero crossing, the integrated feedback signal at the output of the integration circuit will be offset by a small offset error from an ideal value, where the ideal value will be proportional to the angular displacement of the scan mirror as measured from the maximum angular displacement when the scan mirror reverse its scanning direction. This small offset error generally is proportional to the small time delay as measured from the closing of the switch at each zero crossing. This small offset error can be neglected, if the magnitude of the feedback signal generated from the feedback coil 242 during the time period of the small time delay is much smaller than the peak magnitude of the feedback signal. In a situation that the small offset error can be neglected, the scan magnitude of the scan mirror can still be directly regulated and be maintained close to certain constant with the drive circuit 244 as shown in FIG. 5, even if the feedback signal generated from the feedback coil 242 does not pass through the track and hold circuit 102.

As also depicted in FIG. 4, during the initial start-up of the drive motor, that is prior to reaching the steady-state condition, the voltage of the peaks of the uncorrupted feedback signal successively increases, while the corresponding magnitude of the square waves of the drive signal successively decrease. The magnitude of the square waves only changes at SOS boundaries, that is, at the zero crossings.

Turning again to FIG. 5, the integrated feedback signal from the front end circuit 100 is connected to a positive peak detector (PPD) 116 and a negative peak detector (NPD) 118. The peak outputs of the PPD and NPD are conducted to negative inputs of error amplifiers 120, 122. Positive and negative reference voltages are conducted to the positive inputs of the error amplifiers. The outputs of the error amplifiers are connected to a commutator switch 124 under the control of the SOS signal. The output of the switch 124 is conducted back to the drive coil 240 via a kick signal switch 126, and a push-pull drive having an inverter 128 and an amplifier 130 in one branch is connected to one end of the drive coil 240, and an amplifier 132 in another branch is connected to the opposite end of the drive coil 240. As shown, the circuit of FIG. 5 includes a positive feedback arrangement (via the SOS signal path) that passes through a motor assembly (FIG. 2) where the natural frequency of the motor determines the oscillation frequency of the loop, and a negative feedback arrangement (via the integrated feedback signal path) that controls the amplitude of the motor.

Timing circuits 134 are used to generate a kick signal for the kick switch 126, a reset NPD signal to reset the NPD 118, a reset PPD signal to reset the PPD 116, and the SOS signal to control the commutator switch 124. All of these signals are depicted in FIG. 6.

In operation, the integrated feedback signal from the front end circuit 100 is processed to produce a square wave drive signal. More particularly, the integrated feedback signal is peak detected by the PPD and the NPD and compared to a fixed reference value. The result of this comparison is a PPD signal and an NPD signal which closely resemble a square wave at the outputs of the error amplifiers. The switch 124 is switched in synchronism with the SOS signal, to produce a more ideal square wave drive signal that is in proportion to the amplitude error that was detected by the respective error amplifier during the previous SOS state. In other words, a correction during a current SOS state is made based on the voltage peak detected during the previous SOS state. Each of the PPD and the NPD is reset on alternate SOS edges so that new information can be evaluated.

Referring again to FIG. 6, the first pulse labeled "kick" of the drive signal that is delivered to the drive coil via kick switch 126 is generated by timing circuits 134 and does not depend on feedback information. The second pulse labeled $f_{(B1)}$ is derived from evaluating peak velocity information B1 that was acquired during the previous SOS period while the motor was being kicked. The magnitude of $f_{(B1)}$ is determined by the corresponding error amplifier 120 or 122. The third pulse labeled $f_{(A1)}$ is derived from evaluating peak velocity information A1 that was acquired during the previous SOS period. Successive pulses are processed in the same way. The drive signal preferably has a 50% duty cycle synchronized to the SOS signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A motor drive circuit in a light scanning arrangement, comprising:
    a) a drive coil driven by a drive signal to oscillate a scan mirror and a light beam reflected from the scan mirror;
    b) a feedback coil for generating a feedback signal having zero crossings during oscillation of the scan mirror, the feedback coil being in proximity to the drive coil and being corrupted by cross-coupling between the coils at each zero crossing;
    c) circuitry for minimizing the cross-coupling at each zero crossing to generate an uncorrupted feedback signal;
    d) circuitry for integrating the uncorrupted feedback signal to generate an integrated feedback signal; and
    e) circuitry for processing the integrated feedback signal and the uncorrupted feedback signal to generate the drive signal as a square wave having vertical edges respectively corresponding to the zero crossings.

2. The motor drive circuit of claim 1, wherein the scan mirror has a permanent magnet mounted thereon for joint oscillation therewith, and wherein the square wave drive signal generates an electromagnetic field which interacts with a permanent magnetic field of the magnet to oscillate the mirror and the magnet in opposite drive directions at a drive frequency.

3. The motor drive circuit of claim 1, further comprising circuitry for generating a start-of-scan signal from the uncorrupted feedback signal.

4. The motor drive circuit of claim 3, wherein the circuitry for processing comprises circuitry for processing the integrated feedback signal and the start-of-scan signal to generate the drive signal as a square wave having vertical edges respectively corresponding to the zero crossings.

5. The motor drive circuit of claim 1, wherein the circuitry for integrating the uncorrupted feedback signal comprises circuitry for charging an integration capacitor in an integration circuit.

6. The motor drive circuit of claim 5, wherein the circuitry for integrating the uncorrupted feedback signal further comprises circuitry for driving a switch into a closing state at each zero crossing to discharge the integration capacitor.

7. The motor drive circuit of claim 1, wherein the processing circuitry includes a positive peak detector and a negative peak detector having inputs to which the integrated feedback signal is conducted, and having outputs from which positive and negative peak voltages are conducted to first terminals of error amplifiers, the error amplifiers having second terminals connected to positive and negative reference voltages.

8. The motor drive circuit of claim 7, wherein the error amplifiers have outputs connected to a commutator switch which is switched between the outputs of the error amplifiers to generate the square wave drive signal.

9. A method of driving a motor in a light scanning arrangement, comprising the steps of:
    a) driving a drive coil with a drive signal to oscillate a scan mirror and a light beam reflected from the scan mirror;
    b) generating a feedback signal having zero crossings during oscillation of the scan mirror by a feedback coil in proximity to the drive coil, the feedback coil being corrupted by cross-coupling between the coils at each zero crossing;
    c) minimizing the cross-coupling at each zero crossing to generate an uncorrupted feedback signal;
    d) integrating the uncorrupted feedback signal to generate an integrated feedback signal; and
    e) processing the integrated feedback signal and the uncorrupted feedback signal to generate the drive signal as a square wave having vertical edges respectively corresponding to the zero crossings.

10. The method of claim 9, and the step of mounting a permanent magnet on the scan mirror for joint oscillation therewith, and wherein the square wave drive signal generates an electromagnetic field which interacts with a permanent magnetic field of the magnet to oscillate the mirror and the magnet in opposite drive directions at a drive frequency.

11. The method of claim 9, and the step of generating a start-of-scan signal from the uncorrupted feedback signal.

12. The method of claim 11, and wherein the step of processing comprises processing the integrated feedback signal and the start-of-scan signal to generate the drive signal as a square wave having vertical edges respectively corresponding to the zero crossings.

13. The method of claim 9, wherein the step of integrating the uncorrupted feedback signal comprises a step of charging an integration capacitor in an integration circuit.

14. The method of claim 13, wherein the step of integrating the uncorrupted feedback signal further comprises a step of driving a switch into a closing state at each zero crossing to discharge the integration capacitor.

15. The method of claim 9, wherein the processing step is performed by detecting positive and negative voltage peaks in the integrated feedback signal, and by comparing the positive and negative voltage peaks with reference voltages to obtain positive and negative signals.

16. The method of claim 15, wherein the processing step is performed by switching a commutator switch between the positive and negative signals to obtain the square wave drive signal.

* * * * *